United States Patent Office 3,029,202
Patented Apr. 10, 1962

3,029,202
TREATING WASTE WATER
Kenneth M. Brown, Hinsdale, Ill., assignor to Universal Oil Products Company, Des Plaines, Ill., a corporation of Delaware
No Drawing. Filed Apr. 19, 1960, Ser. No. 23,153
4 Claims. (Cl. 210—63)

This invention relates to the treatment of water and more particularly to a novel method of treating water containing sulfur impurities.

In various industrial applications, water containing sulfur impurities is collected prior to disposal. For example, in a petroleum refinery, large quantities of water are used in refining operations such as purifying hydrocarbon fractions, steam distillation, heat transfer, diluting corrosive materials, etc. When used as a purifying medium, the water becomes contaminated with the impurities removed from the petroleum. When used otherwise in contact with petroleum, the water will contain at least an equilibrium distribution of the impurities contained in the petroleum. The more abundant of these impurities are hydrogen sulfide and ammonia, although other impurities are present as, for examples, aliphatic mercaptans, thiophenols, phenols, etc. With the increase in the size of refineries and in the number of processing steps in refining operations, the amount of impurities in the water is increased to an extent that may be harmful to marine life when the waste water is disposed of in the neighboring streams.

The impurities in waste water from petroleum refineries include ammonium sulfide, sodium sulfide, potassium sulfide, and in some cases hydrogen sulfide, as well as mercaptans, phenols, etc. Although these impurities comprise a minute portion of a large volume of water, the sulfides, for example, consume oxygen when disposed in neighboring streams and rob aquatic life of necessary oxygen. In accordance with the present invention, the waste water is treated in a novel manner to convert the sulfide impurities to a form having an oxygen demand which is considerably reduced and in some cases is practically nil.

While the novel features of the present invention are particularly applicable to the treatment of waste water from a petroleum refinery, it is understood that the invention also is used for the treatment of waste water from any industrial operations releasing water containing sulfur impurities. Such waste water may be released from chemical plants, manufacturing plants, sewerage treatment, etc. Furthermore, while the present invention has particular application in treating waste water prior to disposal, it is understood that the novel process of the present invention serves to improve waste water so that, in some cases, it may be reused within the process. In still other applications, the present invention may be used to treat well water or water from other sources which contain hydrogen sulfide or other sulfur impurities.

As hereinbefore set forth, the sulfur impurities comprise a small proportion of the waste water. The sulfur impurities comprise less than 5% and generally less than 2% by weight of the water. In these small concentrations, the sulfur impurities are converted in accordance with the present invention in order to benefit the water so that it may be disposed of. Accordingly, it is an essential feature of the present invention that the water being treated in accordance with the present invention contain the sulfide impurities in a concentration of less than 5% and generally less than 2% by weight of the water.

In one embodiment the present invention relates to a method of treating waste water containing a sulfur impurity in a concentration of less than 5% by weight of said water, which comprises reacting said sulfur impurity with ascending air in contact with a phthalocyanine catalyst during descent of said water in a cooling tower.

In a specific embodiment the present invention relates to a method of treating waste water containing a sulfur impurity in a concentration of less than 2% by weight of said water, which comprises reacting said sulfur impurity with ascending air in contact with a cobalt phthalocyanine sulfonate catalyst during descent of said water in a cooling tower.

In accordance with the present invention, oxidation of sulfur impurities in waste water is effected in a cooling tower. Many petroleum refineries utilize cooling towers to effect cooling of waste water, and the cooled water then is treated for disposal or for reuse within the process. In accordance with the present invention, concurrent cooling and treatment of the waste water is accomplished, thereby effecting considerable economy in operation. In cases where conventional cooling towers are not already in use, a conventional cooling tower is installed and used in the manner herein described. Any suitable cooling tower may be used in accordance with the present invention. In general the cooling towers are of the atmospheric or mechanical draft type. The mechanical draft cooling tower is either of the forced draft type or of the induced draft type. In conventional cooling towers the distributing decks are made of wood, although some may be made of ceramic. As hereinbefore set forth, the cooling towers for use in the present invention are of the conventional type and are well-known so that further detailed description herein is unnecessary. Regardless of the specific cooling tower construction, the cooled water is collected in a basin in the lower portion of the cooling tower and is disposed of or reused within the process. Such reuse includes the dilution, stripping or washing operations or as a heat exchange medium in exchangers, coolers, condensers, etc.

As described above, water containing a sulfur impurity is reacted with an oxidizing agent in the presence of a phthalocyanine catalyst while the water is undergoing descent and cooling in a cooling tower. This treatment serves to convert ammonium sulfide, sodium sulfide, potassium sulfide, and hydrogen sulfide, when present, primarily to the corresponding thiosulfates and in part to the sulfates. It will be noted that the thiosulfates and sulfates are in a highly oxidized state and thus will not have an oxygen demand, in contrast to the high oxygen demand of the sulfides. When present, mercaptans, phenols, etc. also are converted to an oxidized state and accordingly have a reduced oxygen demand.

Any suitable phthalocyanine catalyst may be used in the present invention and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, nickel phthalocyanine, molybdenum phthalocyanine, chromium phthalocyanine, tungsten phthalocyanine, etc. The metal phthalocyanine, in general, is not readily soluble in aqueous solvents and, to facilitate use thereof, a derivative of the phthalocyanine is preferred. A particularly preferred derivative is the sulfonated derivative. Thus, an especially preferred phthalocyanine catalyst is cobalt phthalocyanine sulfonate. Such a catalyst is available commercially and comprises cobalt phthalocyanine disulfonate and also contains cobalt phthalocyanine monosulfonate. Another preferred catalyst comprises vanadium phthalocyanine sulfonate. These compounds may be obtained from any suitable source or may be prepared in any suitable manner as, for example, by reacting cobalt or vanadium phthalocyanine with 25–50% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

As hereinbefore set forth, in a conventional cooling tower, air passes upwardly through the descending stream of water. The temperature prevailing in the cooling tower generally is in the neighborhood of 80° to 130° F., which is particularly of advantage for effecting the desired oxidation reaction in the presence of the phthalocyanine catalyst.

In one embodiment of the invention the phthalocyanine catalyst is added directly to the waste water stream prior to introduction thereof into the cooling tower. In another embodiment the phthalocyanine catalyst is prepared as a solution in water containing a trace and up to about 20% by weight of ammonium hydroxide, sodium hydroxide, potassium hydroxide, etc. and then this solution is commingled with the waste water stream prior to introduction thereof into the cooling tower. In still another embodiment, the catalyst is deposited upon the decks of the cooling tower and serves as a catalyst in this manner. In this embodiment the catalyst is prepared as a solution in the manner described above and is passed downwardly through the cooling tower, preferably with recirculation, until a sufficient quantity of the catalyst is deposited upon the distributing decks in the cooling tower. In still another embodiment the catalyst originally is commingled with the water in the manner described above and all or a portion of the catalyst becomes deposited on the distributing decks during such use, so that the continuous further addition of catalyst in the waste water is unnecessary.

The amount of catalyst required generally is quite small and may range from about 5 to 100 parts per million or more of the waste water. As the catalyst deposits on the decks in the cooling tower, the amount introduced in the incoming waste water may be reduced or, as mentioned above, subsequently eliminated entirely or added intermittently as required.

Following the treatment in the manner hereinbefore described, the waste water now is substantially reduced in sulfides and may be disposed of into neighboring streams. The treated water will have a low or practically no oxygen demand due to sulfur compounds and therefore will not rob aquatic life of the necessary oxygen. As hereinbefore set forth, in some cases it may be desired to reuse within the process the water treated in the above manner. The treated water either may be used as such or, if desired, may be given any additional treatment to further improve it for such reuse.

The particular method of accumulating the waste water will depend upon the specific situs at which the waste water is available. For example, in a petroleum refinery, water is used in numerous places in the refinery and the waste water generally is collected in one or several places in the refinery. Water is used to strip hydrocarbons from catalysts in a catalytic cracking operation. Water also is used to dilute the effluent products from a reactor of a reforming process employed to treat gasoline to increase the anti-knock characteristics thereof. Water also is used in a refinery to dilute overhead vaporous products from fractionators. Aqueous solutions of sodium hydroxide or potassium hydroxide are used to treat hydrocarbon streams containing hydrogen sulfide and/or mercaptans, and the water from such treatment contains sodium or potassium sulfides and/or mercaptides. The different waste water streams generally are collected in one or more zones, and the waste water so collected then is treated in the manner heretofore described to convert the sulfur impurities. In some cases the waste water may first be stripped with light hydrocarbon gases or flue gases to remove volatile impurities therefrom and the stripped waste water then is treated in the same manner herein described. In any event, the sulfur impurities comprise less than 5% and generally less than 2% by weight of the water.

The following examples are introduced to illustrate further the novelty and utility of the present invention but not with the intention of unduly limiting the same.

*Example I*

In a petroleum refinery processing approximately 20,000 barrels per day of crude oil, there will be approximately 20,000 gallons per minute of waste water to be cooled. Approximately two parts per million of cobalt phthalocyanine disulfonate, based upon the water to be cooled, is commingled with the waste water at a temperature of about 120° F. and then passed downwardly through a conventional cooling tower, in countercurrent contact with ascending air. This treatment serves to cool the water to a temperature of about 90° F. and to convert sulfur impurities contained in the waste water.

*Example II*

A solution of vanadium phthalocyanine disulfonate in aqueous ammonium hydroxide solution is prepared and passed downwardly in a conventional cooling tower. The aqueous catalyst solution is recycled within the cooling tower until a substantial quantity of catalyst is deposited upon the wooden decks in the cooling tower.

Following the above, waste water from the refinery is introduced into the cooling tower in counter-current contact with an ascending stream of air. During contact with the air and catalyst, sulfur impurities in the waste water are oxidized. Some loss of catalyst may occur during such treatment and it is desirable to intermittently introduce additional catalyst with the waste water entering the cooling tower.

I claim as my invention:

1. In the cooling of water by countercurrent contact with ascending air while the water is descending through a cooling tower maintained at a temperature of from about 80° to about 130° F., said water containing an inorganic sulfide impurity in a concentration of less than 5% by weight, the method of reducing the oxygen demand of said water which comprises effecting said cooling and contact of the water with air in the presence of a phthalocyanine catalyst.

2. The method of claim 1 further characterized in that said catalyst comprises a cobalt phthalocyanine sulfonate.

3. The method of claim 1 further characterized in that said catalyst comprises a vanadium phthalocyanine sulfonate.

4. The method of claim 1 further characterized in that the phthalocyanine catalyst is deposited on the decks of the cooling tower.

References Cited in the file of this patent

UNITED STATES PATENTS

| | | |
|---|---|---|
| 2,859,766 | Shuldener | Nov. 11, 1958 |
| 2,832,224 | Gleim et al. | Apr. 14, 1959 |